United States Patent [19]
Gustavson et al.

[11] Patent Number: 5,821,853
[45] Date of Patent: Oct. 13, 1998

[54] AMBIENT LIGHT MONITORING SYSTEM

[75] Inventors: Robert Gustavson, 1526 East Ocean Boulevard, Newport Beach, Calif. 92661; Frank A. Rose, Lake Forest, Calif.

[73] Assignee: Robert Gustavson, Newport Beach, Calif.

[21] Appl. No.: 744,185

[22] Filed: Nov. 5, 1996

[51] Int. Cl.[6] .............................. B60Q 1/26; H05B 37/02
[52] U.S. Cl. ........................ 340/468; 340/469; 340/691; 315/362; 315/DIG. 4
[58] Field of Search ................................... 340/565, 567, 340/600, 468, 469, 691, 693; 315/360, 362, 307, DIG. 4; 307/141, 141.4

[56] References Cited

U.S. PATENT DOCUMENTS

| | | | |
|---|---|---|---|
| 3,684,919 | 8/1972 | Cramer | 315/DIG. 4 |
| 3,704,374 | 11/1972 | Kaufman | 250/206 |
| 4,249,160 | 2/1981 | Chilvers | 340/902 |
| 4,476,584 | 10/1984 | Dages | 455/182 |
| 4,593,234 | 6/1986 | Yang | 315/362 |
| 4,768,020 | 8/1988 | Chen | 340/567 |
| 4,902,906 | 2/1990 | Murphy | 307/141.1 |
| 5,003,288 | 3/1991 | Wilhelm | 340/457.2 |
| 5,187,383 | 2/1993 | Taccetta | 307/10.8 |
| 5,559,395 | 9/1996 | Venkitasubahmanian et al. | 315/DIG. 4 |
| 5,583,933 | 12/1996 | Mark | 379/355 |

*Primary Examiner*—Brent A. Swarthout
*Assistant Examiner*—Van Thanh Trieu

[57] ABSTRACT

This invention includes a sensor, a time delay trigger circuit, and a power source. The sensor monitors an ambient light level and produces a sensed signal related to the ambient light level. The time delay trigger circuit is in electrical communication with the sensor for determining whether the ambient light level remains reduced below a predetermined level for a specified time. The time delay trigger circuit includes a counter/timer circuit, a comparator circuit, a timing gate circuit, and an output driver. The counter/timer circuit receives the sensed signal from the sensor and initiates a count sequence when the ambient light level is below a predetermined level. The counter/timer circuit provides a count value output representing elapsed time. The comparator circuit includes a plurality of switches used to set the specified time delay. The comparator circuit compares the count value output from the counter/timer circuit with the switches. The comparator circuit provides an output indicative of the comparisons. The timing gate circuit receives the output from the comparator circuit. The timing gate circuit is in communication with the counter/timer circuit to stop the count sequence when the comparator circuit output indicates that the count value output from the counter/timer circuit equals values set by the plurality of switches. The count value output is a binary coded decimal (BCD) output. The output driver includes an output triggering circuit for receiving the output from the comparator circuit, for holding the trigger state and for providing a drive signal. An output interface of the output driver includes at least one electrical system output for receiving the drive signal. The electrical system output is connectable to a desired electrical system.

20 Claims, 2 Drawing Sheets

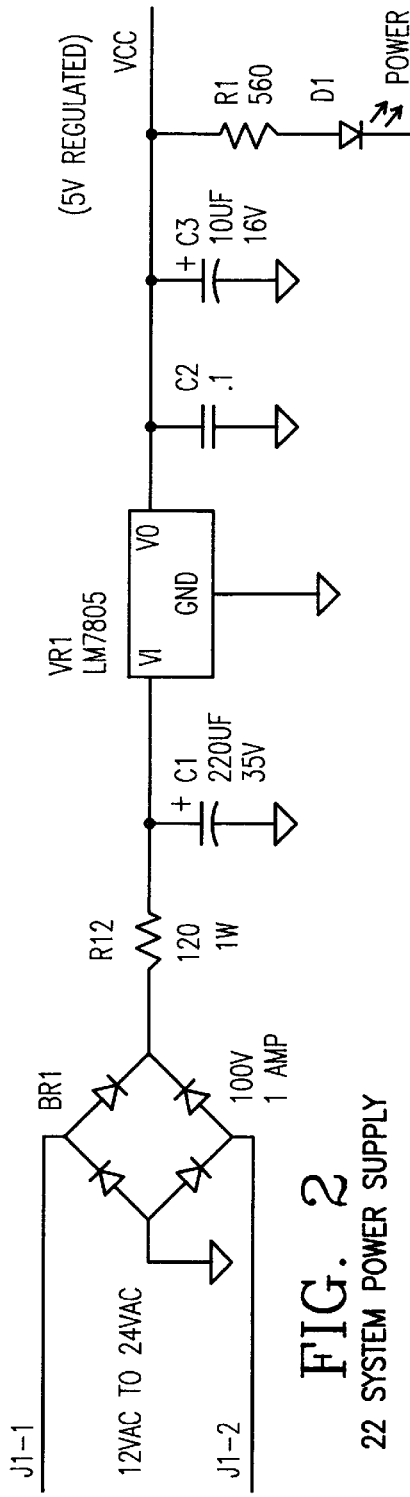
FIG. 2   22 SYSTEM POWER SUPPLY
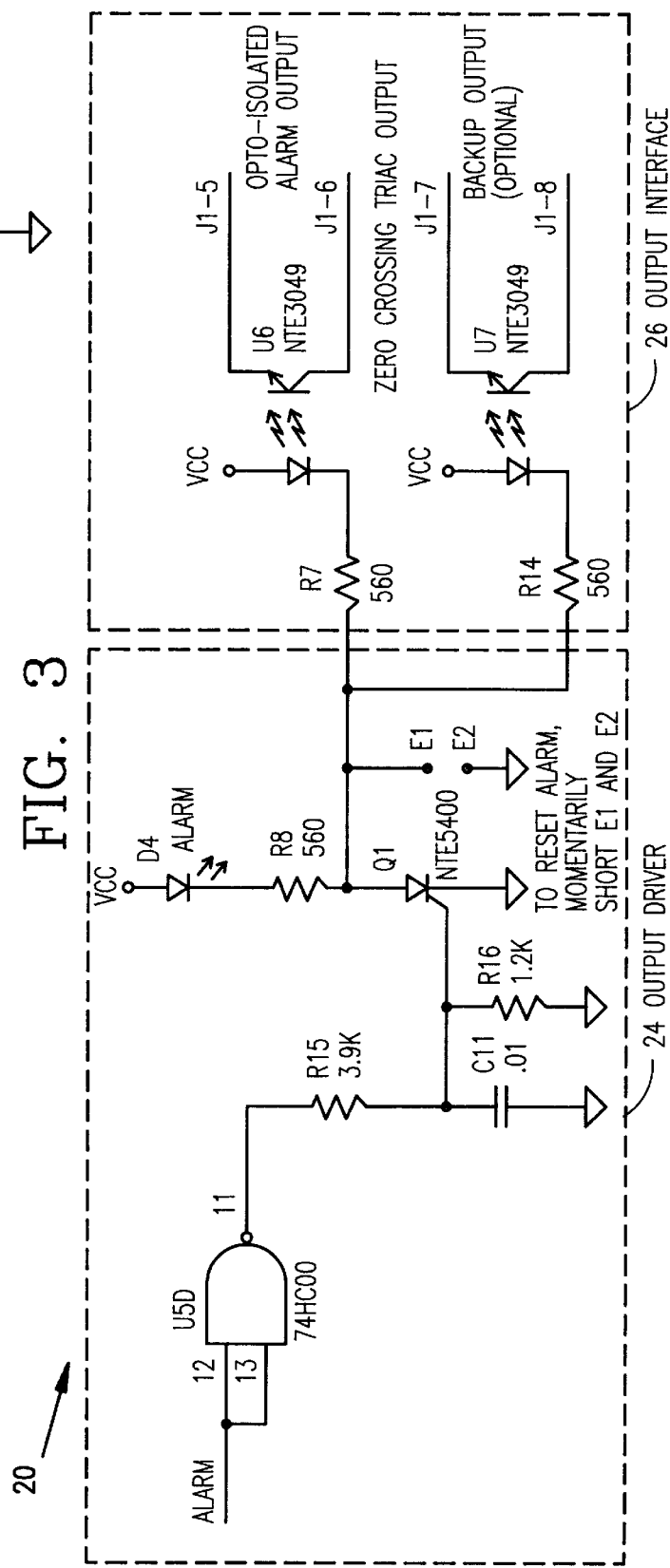
FIG. 3

AMBIENT LIGHT MONITORING SYSTEM

BACKGROUND OF THE INVENTION

1. Field of the Invention

The present invention relates to the monitoring of ambient light levels and more particularly to a system for monitoring ambient light levels utilizing a digitally controlled time delay triggering circuit.

2. Description of the Related Art

Automated Teller Machines (ATMS) have empowered the consumer to service individual banking needs outside traditional branch offices. The use of ATMs began in the 70's. There are about 250,000 machines in operation today, each providing approximately six million dollars of direct transactions by account holders annually. Banks recognize ATMs can deliver a vast menu of service options to customers without service provision costs. Consumers have developed a "user-friendly" relationship with ATMs, not yet established with home-based banking. ATMs are likely to compliment growing home banking services as convenient cash distribution points. While ATMs have revolutionized consumer banking they have also become new crime venues evoking questions of liability and encouraging costly litigation.

A huge safety consideration relative to their use must not merely focus on maintaining adequate light levels but must also focus on the monitoring, at night, for burned out bulbs and changing light conditions.

OBJECTS AND SUMMARY OF THE INVENTION

In view of the foregoing it is a principal object of the present invention to provide continual monitoring of light levels at the ATM environment.

It is another object to provide enablement of a backup lighting system in the event of a lighting failure.

It is another object to provide a system in which the alarm outputs are maintained electrically isolated from the main circuitry of the system.

These and other objects are achieved by the present invention, which in a broad aspect includes a sensor, a time delay trigger circuit, and a power source. The sensor monitors an ambient light level and produces a sensed signal related to the ambient light level. The time delay trigger circuit is in electrical communication with the sensor for determining whether the ambient light level remains reduced below a predetermined level for a specified time.

The time delay trigger circuit includes a counter/timer circuit, a comparator circuit, a timing gate circuit, and an output driver. The counter/timer circuit receives the sensed signal from the sensor and initiates a count sequence when the ambient light level is below a predetermined level. The counter/timer circuit provides a count value output representing elapsed time. The comparator circuit includes a plurality of switches used to set the specified time delay. The comparator circuit compares the count value output from the counter/timer circuit with the switches. The comparator circuit provides an output indicative of the comparisons. The timing gate circuit receives the output from the comparator circuit. The timing gate circuit is in communication with the counter/timer circuit to stop the count sequence when the comparator circuit output indicates that the count value output from the counter/timer circuit equals values set by the plurality of switches. The count value output is a binary coded decimal (BCD) output. The output driver includes an output triggering circuit for receiving the output from the comparator circuit, for holding the trigger state and for providing an internal drive signal. An output interface of the output driver includes at least one electrical system output for receiving the internal drive signal and providing an external drive signal. The electrical system output is connectable to a desired electrical system. Such an electrical system may be, for example, an alarm system or a backup lighting system. Other examples, include a zoned alarm panel, an energy management control system, or stand-alone audio or visual annunciation panels, i.e. horns, buzzers, etc. A power source provides an energy source for the sensor and the time delay trigger circuit.

The system of the present invention can provide 24-hour monitoring of light levels at the ATM environment. Upon light loss and after a programmed time delay, the time delay trigger circuit triggers an alarm signal indicating the lighting failure. The present invention provides more than just a low-cost alternative to manually inspecting ATM sights at night. Not only does the invention alarm off-site when primary lighting fails, but also an additional set of alarm contacts enable an emergency backup lighting system and if the bank chooses, the ATM can be shut down, eliminating public use until primary lighting is restored.

The two separate alarm outputs are electrically isolated from the main circuitry, preventing electrical interference with sensitive alarm systems. An automatic reset and manual reset eliminate false alarms. LED annunciation for power on and circuitry status is provided for easy diagnostics. Four LED indicator lights confirm power output, timing function, alarm trigger, and alarm closure.

Other objects, advantages, and novel features will become apparent from the following detailed description of the invention when considered in conjunction with the accompanying drawings.

BRIEF DESCRIPTION OF THE DRAWINGS

FIG. 2 is a schematic diagram of the system power supply.

FIG. 3 is a schematic diagram of the alarm output interface of the system of the present invention.

The same parts or elements throughout the drawings are designated by the same reference characters.

DETAILED DESCRIPTION OF THE PREFERRED EMBODIMENTS

Figure 1:
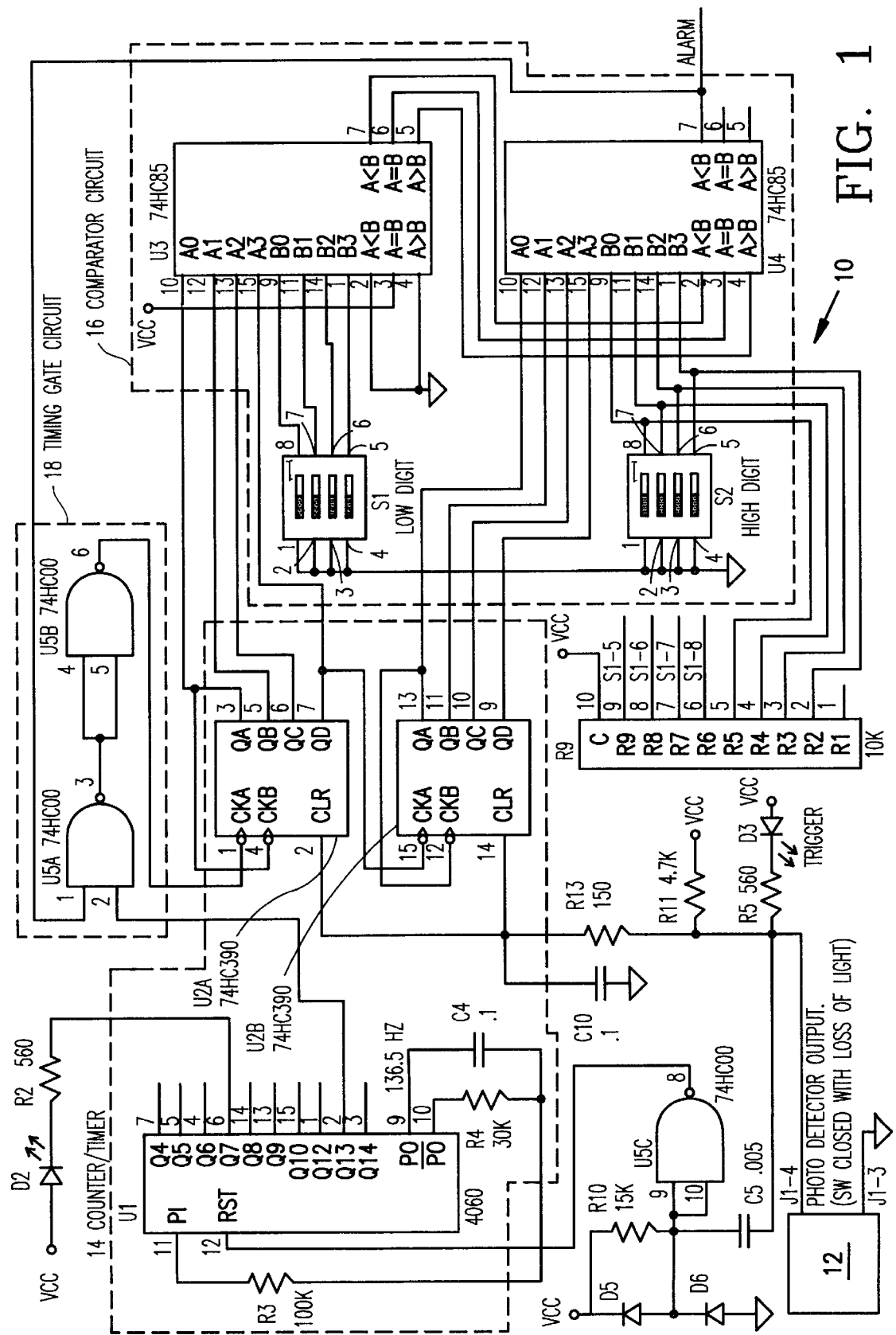
FIG. 1 is a schematic diagram of a main portion of the system of monitoring light levels of the present invention.

Referring now to the drawings and the characters of reference marked thereon FIG. 1 illustrates a main portion 10 of the circuitry for the system of the present invention. The system described in detail herein below is particularly useful for monitoring lighting around ATM machines, however, it is understood that the inventive principles herein are applicable to monitoring light levels for a variety of applications. Examples of applications include: 24-hour unmanned retail facilities providing services in exterior locations that have the need to limit liability or exposure to loss from crime and vandalism, i.e. unmanned gas stations, stand-alone kiosk banks, unmanned or attended public parking structures/lots i.e. mass transit lots, long-term airport parking.

A sensor 12 monitors the ambient light level and produces a sensed signal related to that ambient light level. The function of sensor 12 is to close a set of isolated contacts with the onset of darkness, and open them in the light. A suitable sensor may be a commercially available low voltage photo control, such as the type used for energy management systems. A sensor utilized may be, for example, the model EM 24A2 Photo Control manufactured by DON-ELL Corporation, Sylvania, Ohio. A power supply converts 24 VAC into 12 VDC. A cadmium-sulfide photoresistive component is the input to a comparator circuit which switches at designated light levels. A time delay circuit delays switching of the output as required by the application. The output section includes a reed relay with hermetically sealed contacts electrically isolated from the input.

A timed delay trigger circuit is in electrical communication with the sensor 12 for determining whether the ambient light level remains reduced below a predetermined level for a specified time. The time delay trigger circuit includes a counter/timer circuit 14, a comparator circuit 16, a timing gate circuit 18, and an output driver 20 (see FIG. 3). A power supply 22 (see FIG. 2) provides an energy source for the sensor and time delay trigger circuit.

In the preferred embodiment illustrated in the figures, U1 (a CD4060), R4, C4 and R3 form a 136.5 Hz oscillator which is the oscillator-time base generator for the system 10. The oscillator frequency is divided by 8192 which provides a counting pulse once each minute. As a monitor to verify that the oscillator is running, LED D2 and R2 are connected to U1 at a divider tap that provides 1.066 flashes per second for the LED. This gives the operator a quick indication that the timing system is running.

The 1 minute pulses are fed through a gate/latch circuit (U5A, U5B) to counter (U2A and U2B). U2A and B are dual decade counters that will count from 0 to 99. This provides an alarm time delay of 1 to 99 minutes. When the photo cell is in the normal operating state (that is, the ATM machine is lighted), the photo cell input line (J1-4) is at +5V (a logic 1). This forces U2A and B into the reset state, preventing it from counting. When the photo cell detects a loss of light, J1 pin 4 is clamped to 0 volts by the photo cell. This removes the reset signal from U2, allowing it to count at 1 count per minute. At the same time, capacitor C5 couples a reset to U1 pin 12, insuring that the first 1 minute pulse occurs at exactly one minute. Diodes D5 and D6 provide latch up protection for the U5C which is a CMOS device.

The output from the time delay counter is fed to a binary comparator circuit formed by U3 and U4. Two dip switches (S1 and S2) provide the time delay value to compare the counter against. When the value in counters U2A and B match the value set by switches S1 and S2, the output of the comparator (U4 pin 7) will go from a logic 1 state to a logic 0 state. This signal is fed to U5A pin 1, which prevents the timing pulses from reaching the counter. This has the effect of freezing the time delay counter (U2), and preserving the output of the comparator. The comparator will remain in this state until the photo cell alarm signal is removed. When the photo cell alarm signal is removed (that is, the light levels are restored), the photo cell input line (J1-4) goes from zero volts (logic 0) to +5 volts (logic 1). This causes the voltage on U2B pin 14 to go to a logic 1, resetting the time delay counter for the next cycle.

The output driver 20 includes an output triggering circuit 24 for receiving the output from the comparator circuit (see FIG. 3). An output interface 26 receives an internal drive signal (U5D pin 11) from the output triggering circuit 24. The alarm output from U4 pin 7 is also inverted by U5D, and fed to an SCR (Q1). The output of the Q1 drives opto isolators U6 and U7 for the isolated alarm output (the external drive signal J1-5, J1-6, J1-7 and J1-8). The opto isolator preferably uses a zero crossing triac for driving AC voltage. Once fired, Q1 will continue to drive the opto couplers even if the alarm signal from U4 pin 7 is removed. The opto isolator uses a zero-crossing triac for driving DC voltage as well, 30 VDC max 100 mA.

When the photo cell alarm signal is removed, the counter (U2) is reset, but this does not remove the alarm signal from Q1. Q1 can be reset by momentarily shorting pins E1 and E2 through the external reset buttons.

The power supply 22 includes a bridge rectifier BR1, resistor R12, capacitor C1, regulator VR1, and capacitors C2 and C3. The bridge rectifier, BR1, R12 and C1 convert the input voltage to DC. The input can be either AC or DC. Regulator VR1 converts the DC voltage on C1 to 5 VDC to power the system. For high input voltages (i.e., 24V AC input) resistor R12 reduces the DC voltage applied to the voltage regulator, and reduces the power dissipated by the regulator. Capacitors C2 and C3 help suppress transients generated by the digital circuitry.

During operation, the photo cell of the sensor 12 monitors the light levels around the ATM machine. If the light level falls below the predetermined level, the photo cell triggers the time delay circuit. After the programmed time delay, the time delay trigger circuit sends an alarm signal indicating the lighting failure. In this preferred embodiment, the time delay between the lighting failure and alarm output is programmable in one minute increments using the switches mounted on the time delay trigger circuit board. The minimum delay is one minute and the maximum is 99 minutes. Two separate alarm outputs are provided that can be used to trigger the failure alarm, or any other output device. As noted above, the alarm outputs from the time delay trigger circuit are electrically isolated from the main circuitry using the opto isolators.

Obviously, many modifications and variations of the present invention are possible in light of the above teachings. It is, therefore, to be understood that within the scope of the appended claims, the invention may be practiced otherwise than as specifically described.

What is claimed and desired to be secured by Letters Patent of the United States is:

1. A system for monitoring lighting levels in a light illuminated area which includes lighting means for providing an external drive signal to an electrical system in response to a change in the ambient light level, comprising:

a) a sensor for monitoring an ambient light level and producing a sensed signal related to said ambient light level, b) a time delay trigger circuit in electrical communication with said sensor for determining whether said ambient light level remains reduced below a predetermined level for a specified time, said time delay trigger circuit, comprising:

a counter/timer circuit for receiving said sensed signal and for initiating a count sequence when said ambient light level is below a predetermined level, said counter/timer circuit providing a count value output representing elapsed time;

a comparator circuit comprising a plurality of switches used to set said specified time delay, said comparator circuit for comparing said count value output from said counter/timer circuit with said switches, said comparator circuit providing an output indicative of said comparisons;

a timing gate circuit for receiving said output from said comparator circuit, said timing gate circuit being in communication with said counter/timer circuit to stop said count sequence when said comparator circuit output indicates that said count value output from said counter/timer circuit equals values set by said plurality of switches corresponding to an improperly functioning lighting means; and an output driver, comprising:

an output triggering circuit for receiving said output from said comparator circuit, for holding a trigger state until being manually reset and for providing an internal drive signal when said counter/timer circuit stops said counter sequence, said output triggering circuit further providing a visual indication of an alarm state in response to said internal drive signal and indicating an improperly functioning lighting means; and an output interface comprising at least one electrical system output for receiving said internal drive signal and providing an external drive signal to an alarm, said electrical system output being connectable to an electrical system; and c) a power source for providing an energy source for said sensor and time delay trigger circuit.

2. The system of claim 1, wherein said sensor comprises a photocell.

3. The system of claim 1, wherein said counter/timer circuit, comprises:

an oscillator-time base generator for providing time pulses which are passed through said timing gate circuit; and a counter for receiving time pulses which were passed through said timing gate circuit for providing said count sequence.

4. The system of claim 1, wherein said specified time is in a range of about 1 minute to about 99 minutes.

5. The system of claim 1, wherein said output triggering circuit, comprises:

a silicon controlled rectifier (SCR).

6. The system of claim 1, wherein said electrical system output comprises zero-crossing optically isolated outputs.

7. The system of claim 1, wherein said power source comprises:

an AC to DC converter connectable to an external power source; and a voltage regulator connected to said AC to DC converter.

8. The system of claim 1, wherein said counter/timer circuit provides a binary coded decimal (BCD) output.

9. The system of claim 1, wherein said sensor monitors ambient light levels in the vicinity of an automated teller machine.

10. The system of claim 1, wherein said electrical system output is connectable to an alarm system.

11. The system of claim 1, wherein said counter/timer circuit further includes means for being reset by said sensor if said sensed signal is removed before the elapsed time, thus preventing false triggers.

12. A time delay trigger circuit for use with a light monitoring system in a light illuminated area which includes lighting means, said light monitoring system being of a type that utilizes: (1) a sensor for monitoring an ambient light level and producing a sensed signal related to said ambient light level; and (2) a power source for providing an energy source for said sensor and time delay trigger circuit, said light monitoring system for providing an external drive signal to an electrical system in response to a change in the ambient light level, said time delay trigger circuit comprising:

d) a counter/timer circuit for receiving a sensed signal from a sensor monitoring ambient light levels, said counter/timer circuit for initiating a count sequence when said ambient light level is below a predetermined level, said counter/timer circuit providing a count value output representing elapsed time;

e) a comparator circuit comprising a plurality of switches used to set a specified time delay representing a specified time in which the ambient light level remains reduced below a predetermined level, said comparator circuit for comparing said count value output from said counter/timer circuit with said switches, said comparator circuit providing an output indicative of said comparisons;

f) a timing gate circuit for receiving said output from said comparator circuit, said timing gate circuit being in communication with said counter/timer circuit to stop said count sequence when said comparator circuit output indicates that said count value output from said counter/timer circuit equals values set by said plurality of switches corresponding to an improperly functioning lighting means; and g) an output driver, comprising:

an output triggering circuit for receiving said output from said comparator circuit, for holding a trigger state until being manually reset and for providing an internal drive signal when said counter/timer circuit stops said counter sequence, said output triggering circuit further providing a visual indication of an alarm state in response to said internal drive signal and indicating an improperly functioning lighting means; and an output interface comprising at least one electrical system output for receiving said internal drive signal and providing an external drive signal to an alarm, said electrical system output being connectable to an electrical system.

13. The system of claim 12, wherein said sensor comprises a photocell.

14. The system of claim 12, wherein said counter/timer circuit, comprises:

an oscillator-time base generator for providing time pulses which are passed through said timing gate circuit; and a counter for receiving time pulses which were passed through said timing gate circuit for providing said count sequence.

15. The system of claim 12, wherein said specified time is in a range of about 1 minute to about 99 minutes.

16. The system of claim 12, wherein said output triggering circuit, comprises:

a silicon controlled rectifier (SCR).

17. The system of claim 12, wherein said electrical system output comprises zero-crossing optically isolated outputs.

18. The system of claim 12, wherein said power source comprises:

an AC to DC converter connectable to an external power source; and a voltage regulator connected to said AC to DC converter.

19. The system of claim 12, wherein said sensor monitors ambient light levels in the vicinity of an automated teller machine.

20. The system of claim 12, wherein said electrical system output is connectable to an alarm system.

* * * * *